US007924523B2

(12) United States Patent
Mathew et al.

(10) Patent No.: US 7,924,523 B2
(45) Date of Patent: Apr. 12, 2011

(54) FREQUENCY DOMAIN APPROACH FOR EFFICIENT COMPUTATION OF FIXED-POINT EQUALIZATION TARGETS

(75) Inventors: George Mathew, San Jose, CA (US); Yuan Xing Lee, San Jose, CA (US); Hongwei Song, Longmont, CO (US); Richard Rauschmayer, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 210 days.

(21) Appl. No.: 12/273,265

(22) Filed: Nov. 18, 2008

(65) Prior Publication Data

US 2009/0161245 A1 Jun. 25, 2009

Related U.S. Application Data

(60) Provisional application No. 61/016,215, filed on Dec. 21, 2007.

(51) Int. Cl.
*G11B 5/035* (2006.01)

(52) U.S. Cl. .......................................... 360/65; 375/232

(58) Field of Classification Search ........................ None
See application file for complete search history.

(56) References Cited

U.S. PATENT DOCUMENTS 5,262,904 A 11/1993 Tang et al.
5,357,520 A 10/1994 Arnett et al.
5,493,454 A 2/1996 Ziperovich et al.
5,517,146 A 5/1996 Yamasaki
5,583,705 A 12/1996 Ziperovich et al.
5,781,358 A 7/1998 Hasegawa
5,986,830 A 11/1999 Hien
5,999,355 A * 12/1999 Behrens et al. ................. 360/65
6,043,942 A 3/2000 Cunningham et al.
6,091,560 A 7/2000 Du
6,130,794 A 10/2000 Christensen
6,134,691 A 10/2000 Hirasaka
6,141,168 A 10/2000 Takahashi et al.
6,147,828 A 11/2000 Bloodworth et al.
6,181,505 B1 1/2001 Sacks et al.
6,208,481 B1 3/2001 Spurbeck et al.
6,212,024 B1 4/2001 Igarashi et al.
6,243,031 B1 6/2001 Jusuf et al.
6,246,723 B1 * 6/2001 Bliss et al. .................... 375/265

(Continued)

FOREIGN PATENT DOCUMENTS

GB 2 320 866 6/1997

OTHER PUBLICATIONS

U.S. Appl. No. 12/199,325, filed Aug. 27, 2008, Mathew.

(Continued)

*Primary Examiner* — Jason C Olson
(74) *Attorney, Agent, or Firm* — Hamilton, DeSanctis & Cha

(57) ABSTRACT

Various embodiments of the present invention provide systems and methods for equalizing an input signal. For example, various embodiments of the present invention provide a method for performing equalization in a storage device. Such methods include providing an equalizer circuit that is governed by a target value, and a filter circuit that is governed by a filter coefficient. An initial value is provided to the equalizer circuit as the target value, and an overall target based at least in part on the initial value and the filter coefficient is calculated. An updated value is calculated based on the overall target, and the updated value is provided to the equalizer circuit as the target value.

20 Claims, 3 Drawing Sheets

U.S. PATENT DOCUMENTS 6,337,778 B1 1/2002 Gagne
6,396,651 B1 5/2002 Grover
6,404,572 B1 6/2002 Hong
6,535,345 B1 3/2003 Shimoda
6,563,655 B1 5/2003 Yamasaki et al.
6,621,648 B2 9/2003 Elliot et al.
6,662,303 B1 12/2003 Toosky et al.
6,671,244 B2 12/2003 Honma
6,674,590 B2 1/2004 Ottesen et al.
6,678,230 B2 * 1/2004 Miyashita et al. ......... 369/53.16
6,721,114 B1 4/2004 Sutardja et al.
6,788,481 B2 9/2004 Fang et al.
6,894,854 B1 5/2005 Carlson et al.
6,912,682 B1 6/2005 Aoki
6,934,100 B2 8/2005 Ueno
6,937,415 B2 8/2005 Galbraith et al.
7,012,772 B1 3/2006 Vis
7,079,342 B1 7/2006 Han et al.
7,092,179 B2 8/2006 Yamanouchi
7,123,429 B2 10/2006 Musungu et al.
7,126,773 B1 10/2006 Taratorin
7,193,802 B2 3/2007 Cideciyan et al.
7,248,424 B2 7/2007 Ueno
7,256,954 B2 8/2007 Serizawa
7,262,928 B1 8/2007 Oberg
7,271,753 B1 9/2007 Padukone et al.
7,308,057 B1 12/2007 Patapoutian
7,440,224 B2 10/2008 Ehrilich et al.
7,495,854 B2 2/2009 Hutchins et al.
7,542,227 B2 6/2009 Che et al.
7,715,135 B1 5/2010 Sutardja et al.
7,733,591 B2 6/2010 Bottemiller et al.
2002/0159350 A1 10/2002 Ogura
2003/0048564 A1 3/2003 Koller et al.
2005/0117243 A1 6/2005 Serizawa et al.
2006/0061496 A1 3/2006 Stein et al.
2006/0062125 A1 3/2006 Horie et al.
2006/0176947 A1 8/2006 Lim
2007/0041115 A1 2/2007 Lee
2007/0047120 A1 3/2007 DeGroat
2007/0076313 A1 4/2007 Hutchins et al.
2007/0140088 A1 * 6/2007 Hino et al. ................. 369/59.22
2008/0031114 A1 2/2008 Hong et al.
2008/0037153 A1 2/2008 Yoshizawa
2008/0081382 A1 4/2008 Yang et al.
2009/0103413 A1 * 4/2009 Matsui et al. ............. 369/59.23

OTHER PUBLICATIONS

U.S. Appl. No. 12/247,378, filed Oct. 8, 2008, Mathew.

Cho and Lee, "An Estimation Technique for Nonlinear Distortion in High Density Magnetic Recording Channels", IEEE Transactions on Magnetics, vol. 34, No. 1, pp. 40-44 Jan. 1998.

DeGroat et al., "Experimental Characterization of Media Noise Based on Equalized Synchronized Drive Data", IEEE Trans. Magnetics, vol. 37, No. 2, pp. 633-638, Mar. 2001.

Farhang-Boroujeny, Adaptive Filters: Theory and Applications. John Wiley & Sons Ltd, 1998, Chapter 11. pp. 373-379.

Kavcic and Patapoutian, "A Signal-Dependent Autoregressive Channel Model", IEEE Trans. Magnetics, vol. 35 No. 5, pp. 2316-2318, Sep. 1999.

Lin et al. "An estimation technique for accurately modelling the magnetic recording channel including nonlinearities." IEEE Trans. Mag, vol. 25, No. 5, pp. 4084-4086, Sep. 1989.

Moon, J., "Signal-to-Noise Ratio Definition for Magnetic Recording Channels With Transition Noise", IEEE Trans. Magnetics, vol. 36, No. 5, pp. 3881-3883, Sep. 2000.

Palmer et al, "Identification of nonlinear write effects using pseudo-random sequences" IEEE Trans. Magnetics, vol. 23 No. 5, pp. 2377-2379, Sep. 1987.

Partovi; et al., "Flow-Through Latch and Edge-Triggered Flip-Flop Hybrid Elements"; Feb. 8, 1996; pp. 138-139; Solid-State Circuits Conference Digest of Technical Papers.

Tokumasu et al. "A New Reduced Clock-Swing Flip-Flop (NDKFF)," Corporate Research & Development Center, Toshiba Corp. IEEE Feb. 2002 Custom Intergrated Circuits Conference.

Wood and Donaldson, "The Helical-Scan Magnetic Tape Recorder as a Digital Communication Channel", IEEE Transactions on Magnetics, vol. MAG-15, No. 2, pp. 935-943 Mar. 1979.

* cited by examiner

FREQUENCY DOMAIN APPROACH FOR EFFICIENT COMPUTATION OF FIXED-POINT EQUALIZATION TARGETS

CROSS REFERENCE TO RELATED APPLICATIONS

The present application claims priority to (is a non-provisional of) U.S. Pat. App. No. 61/016,215 entitled "A Frequency Domain Approach for Efficient Computation of Fixed-point Equalization Targets", and filed Dec. 21, 2007 by Mathew et al. The entirety of the aforementioned application is incorporated herein by reference for all purposes.

BACKGROUND OF THE INVENTION

The present inventions are related to systems and methods for equalizing an input data set.

Reading information from a magnetic storage medium includes receiving an analog electrical signal representing the received information by a read channel circuit that, among other things, equalizes the incoming signal to a primary target. As an example for channels with media noise, an equalization target generally consists of two parts: (1) a relatively short primary equalization target consisting of two or three taps, and (2) a bank of noise prediction filters including a number of individual noise prediction filters that are each tuned to a different data pattern. The overall equalization target consists of the convolution of the primary target with the noise prediction filters. Such a target is data-dependent.

In some cases, determining the appropriate overall target involves selecting what is expected to be a reasonable primary target. Once the primary target is selected using, for example, a mean-squared error (MSE) approach, the coefficients of the bank of noise prediction filters are adaptively selected. Such an approach provides reasonable performance, but does not result in error-rate optimizing solutions. To provide error-rate optimization, more complex and costly approaches may be employed. Such approaches typically rely on error rate based search algorithms to yield an optimum target. In particular, a primary target is established during a calibration phase prior to normal operation by individually selecting each of a number of possible primary targets and thereafter testing each of the selected primary targets. The respective error rate exhibited by each of the primary targets is stored, and the generated error rates are compared one against another to determine the optimum primary target. While such approaches are capable of yielding an optimized primary target, they can be too costly in terms of computational complexity and/or time for practical use.

Hence, for at least the aforementioned reasons, there exists a need in the art for advanced systems and methods for determining equalization targets.

BRIEF SUMMARY OF THE INVENTION

The present inventions are related to systems and methods for equalizing an input data set.

Some embodiments of the present invention provide methods for performing equalization in a storage device. Such methods include providing an equalizer circuit that is governed by a target value, and a filter circuit that is governed by a filter coefficient. An initial value is provided to the equalizer circuit as the target value, and an overall target based at least in part on the initial value and the filter coefficient is calculated. An updated value is calculated based on the overall target, and the updated value is provided to the equalizer circuit as the target value.

In some instances of the aforementioned embodiments, calculating the updated value based on the overall target includes performing the following calculation:

$$g_{m,k} = \sum_{l=0}^{min(k,Nq)} q_l h_{m,k-l}, \text{ for } k = 0, 1, \ldots, N_g, \text{ and } m = 0, 1, \ldots, n.$$

In one or more instances of the aforementioned embodiments, calculating the updated value based on the overall target includes calculating frequency matrices based on the overall target. In some such instances, calculating the updated value based on the overall target further includes computing a floating-point target based on the frequency matrices and determining a fixed-point target based on the calculated target. In some cases, determining the fixed-point target based on the floating-point target includes minimizing a cost function. Calculating the updated value based on the overall target may further include scaling the floating-point target. As an example, the methods may further include providing an analog to digital converter that provides a series of digital samples to the equalizer, and the scaling process is operable to conform the floating-point target to a range of the analog to digital converter.

Other embodiments of the present invention provide storage devices that include a storage medium, a read/write head assembly disposed in relation to the storage medium, and a read channel circuit. The read channel circuit includes an equalization circuit relying on a frequency domain approach for calculating a primary target. The equalization circuit equalizes a data signal derived from the storage medium via the read/write head assembly.

In some instances of the aforementioned embodiments, the equalization circuit includes an equalization filter, a noise prediction filter circuit, a primary target calculation circuit, and a fixed-point selection circuit. Operation of the equalization filter is governed by a target value, and operation of the noise prediction filter circuit is governed by a noise prediction coefficient. The primary target calculation circuit calculates an overall target based at least in part on a first value of the target value and the noise prediction coefficient. The fixed-point selection circuit determines a fixed-point target based on the earlier calculated target.

Yet other embodiments of the present invention provide equalization circuits that include an equalization filter, a noise prediction filter circuit, an overall target calculation circuit and a fixed-point selection circuit. Operation of the equalization filter is governed by a target value, and operation of the noise prediction filter circuit is governed by a noise prediction coefficient. The overall target calculation circuit calculates an overall target based at least in part on a first value of the target value and the noise prediction coefficient. The primary target calculation circuit calculates a primary target based at least in part on a first value of the overall target and a frequency matrix. The fixed-point selection circuit determines a fixed-point target based on the earlier calculated target. In some instances of the aforementioned embodiments, the equalization filter is implemented as a digital finite impulse response filter.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
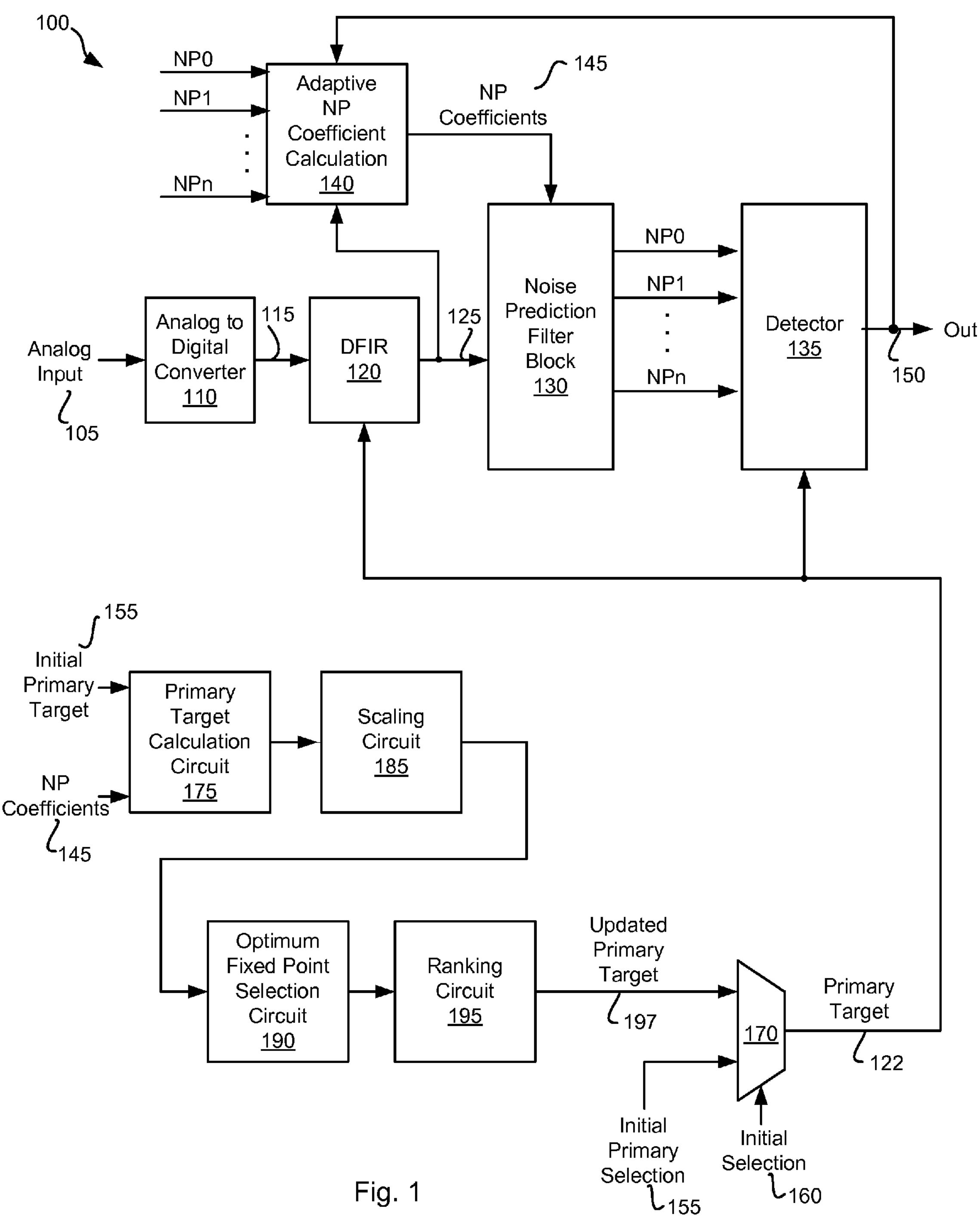
FIG. 1 depicts a data processing system utilizing equalization target determination in accordance with various embodiments of the present invention.

The present inventions are related to systems and methods for equalizing an input data set.

Various embodiments of the present invention provide systems and methods for determining equalization targets for a data transfer system. Such embodiments of the present invention rely on a frequency based approach for selecting a primary target. The frequency-domain based approach may be derived by letting $g=[g_0, g_1, \ldots, g_{Ng}]^T$, where g denotes an overall target including a primary target convolved with a respective noise prediction target. The primary target is denoted by $p=[p_0, p_1, \ldots, p_{Np}]^T$. In this case, $N_p<N_g$. The primary target, p, is designed such that the mismatch between the frequency responses of p and g are minimized in the least-square (LS) sense. The following LS cost function may be used to evaluate the mismatch:

$$J(p)=\sum_{f\in F}|G(f)-P(f)|^2,$$

$$\text{with } G(f)=\sum_{k=0}^{Ng} g_k e^{-j2\pi fk}, \text{ and } P(f)=\sum_{k=0}^{Np} p_k e^{-j2\pi fk},$$

where G(f) and P(f) denote the frequency response of g and p, respectively, and F denotes a grid of normalized frequency spanning the range form 0.0 to 0.5.

The vectors $e_g(f)$ and $e_p(f)$ are defined as:

$$e_g(f)=[1, e^{-j2\pi f}, e^{-j4\pi f}, e^{-j6\pi f}, \ldots, e^{-jNg\pi f}]^T; \text{ and}$$

$$e_p(f)=[1, e^{-j2\pi f}, e^{-j4\pi f}, e^{-j6\pi f}, \ldots, e^{-jNg\pi f}]^T.$$

Using the preceding vector equations, G(f) and P(f) can be expressed as:

$$G(f)=g^T e_g(f); \text{ and}$$

$$P(f)=p^T e_p(f).$$

Through substitution, the cost function can be expressed as:

$$\begin{aligned} J(p) &= \sum_{f\in F}|g^T e_g(f)-p^T e_p(f)|^2 \\ &= g^T E_g g + p^T E_p p - g^T E_{pg}^H p - p^T E_{pg} g, \end{aligned}$$

where $$E_g=\sum_{f\in F} e_g(f)e_g^H(f),\ E_p=\sum_{f\in F} e_p(f)e_p^H(f), \text{ and } E_{pg}=\sum_{f\in F} e_p(f)e_g^H(f).$$

In these equations, the superscript $^H$ denotes a conjugate transpose, unlike the standard transpose $^T$. In this equation, the target coefficients are presumed to be real numbers.

The optimum floating-point primary target that minimizes the cost function J(p) can be determined by setting the gradient of J(p) with respect to p to zero and solving for p. Doing this, the following optimum floating-point target is defined by the following equation:

$$p_{opt}=(E_p+E_p^*)^{-1}(E_{pg}+E_{pg}^*)g, \quad \text{Equation (1)}$$

where the superscript * denotes a complex conjugation.

The matrices $E_p$ and $E_{pg}$ can be computed as follows. First, let the frequency grid be: $F=\{0, \Delta, 2\Delta, 3\Delta, \ldots, L\Delta\}$, where $\Delta=0.5/L$ for a reasonably large positive integer L. Next, the quantity E(k,l) is defined as:

$$\begin{aligned} E(k,l) &= \sum_{f\in F} e^{-j2\pi fk} e^{j2\pi fl} \quad \text{Equation (2)} \\ &= \sum_{m=0}^{L} e^{j2\pi m(l-k)\Delta} \\ &= \frac{1-e^{j2\pi\Delta(L+1)}}{1-e^{j2\pi\Delta}}, \text{ for } k\neq l, \text{ and} \\ &= L+1, \text{ for } k=l. \end{aligned}$$

Then, the $(k,l)^{th}$ elements of the matrices $(E_p+E_p^*)$ and $(E_{pg}+E_{pg}^*)$ can be obtained for $k=0, 1, \ldots, N_p$ as:

$$(E_p+E_p^*)_{(k,l)}=E(k,l)+E^*(k,l) \text{ for } l=0, 1, \ldots, N_p; \text{ and}$$

$$(E_{pg}+E_{pg}^*)_{(k,l)}=E(k,l)+E^*(k,l) \text{ for } l=0, 1, \ldots, N_g.$$

Using equation (2) above, the following may be derived:

$$\begin{aligned} E(k,l)+E^*(k,l) &= \frac{1-\cos(\pi(l-k)/L)-\cos(\pi(L+1)/L)+(-1)^{l-k}}{1-\cos(\pi(l-k)/L)} \\ &= 1+(-1)^{l-k} \text{ for } k\neq l; \text{ and} \\ &= 2L+2 \text{ for } k=l. \end{aligned}$$

Of note, if L is allowed to trend toward infinity, then $(E_p+E_p^*)$ becomes the $(N_p+1)\times(N_p+1)$ identity matrix $I_{Np+1}$, and $(E_{pg}+E_{pg}^*)$ takes the form $[I_{Np+1}\ O_{Ng-Np}]$ where $O_{Ng-Np}$ is a $(N_p+1)\times(N_g-N_p)$ matrix of zeros. This would make the optimum floating-point primary target $p_{opt}$ equal to the first $N_p+1$ coefficients of the given floating-point target g. Thus, by choosing L to be finite (e.g., between one hundred (100) and two hundred (200)), we are in effect introducing a small perturbation in the primary target compared to g.

The target coefficients that result from equation (1) are scaled to satisfy the range of requirements of an upstream analog to digital converter. This is done by scaling the coefficients as set forth below:

$$p_{opt,k} \leftarrow p_{opt,k} * \text{Round}\left(\frac{S_{adc}}{\sum_{l=0}^{Np} |p_{opt,l}|}\right),$$

where $S_{adc}$ is the maximum signal amplitude expected at the output of the equalizer and $p_{opt,k}$ is the $k^{th}$ tap of the target vector $p_{opt}$, for k=0, 1, . . . , $N_p$. The aforementioned scaling operation may not be necessary if the given target, g, is already of the appropriate scale.

The target coefficients that result from the scaling process need to be converted into fixed-point values. Fixed-point values are obtained by selecting a fixed-point target that is closest to $p_{opt}$. This is achieved by minimizing the following least-square cost function:

$$\tilde{J}(\tilde{p}) = \sum_{k=0}^{Np} \left( \frac{p_{opt,k}}{\sum_{l=0}^{Np} p_{opt,l}} - \frac{\tilde{p}_k}{\sum_{l=0}^{Np} \tilde{p}_l} \right)^2.$$

The optimum fixed-point target coefficients that minimize the cost function $\tilde{J}(\tilde{p})$ can be obtained by evaluating $\tilde{J}(\tilde{p})$ over a grid around $p_{opt}$. Since $p_{opt}$ is the floating-point optimum target and because the value of $N_p$ is small, the computation cost and time required to determine the minimum of $\tilde{J}(\tilde{p})$ is small. In some embodiments of the present invention, the value of $N_p$ is one or two.

Turning to FIG. 1, a data processing system 100 utilizing equalization target determination is shown in accordance with various embodiments of the present invention. Data processing system 100 includes an analog to digital converter 110 that receives an analog input signal 110. Analog to digital converter 110 provides a stream of digital samples 115 corresponding to analog input 105. Digital samples 115 are provided to an equalization filter 120 that may be implemented as a digital finite infinite response filter. Equalization filter 120 is governed by a primary target 122. Depending upon the design of equalization filter 120, primary target 122 includes a defined number of filter taps. In one particular embodiment of the present invention, primary target 122 includes two filter taps. In another particular embodiment of the present invention, primary target 122 includes three filter taps. Based upon the disclosure provided herein, one of ordinary skill in the art will recognize different numbers of filter taps that may be included in primary target 122 depending upon the design of equalization filter 120.

An output 125 from equalization filter 120 is provided to a noise prediction filter block 130 and to an adaptive noise prediction coefficient calculation circuit 140. Noise prediction filter block 130 includes a number 'n' of noise prediction filters. The operation of noise prediction filter block 120 is governed by noise prediction coefficients 145. Each of the noise prediction filters provides a respective filtered output (i.e., NP0, NP1, . . . , NPn). In one particular embodiment of the present invention, noise prediction filter block 130 includes eight noise prediction filters. Based upon the disclosure provided herein, one of ordinary skill in the art will recognize different numbers of noise prediction filters that may be utilized in accordance with different embodiments of the present invention. The outputs from noise prediction filter block 130 (i.e., NP0, NP1, . . . , NPn) are provided to a detector 135, and to an adaptive noise prediction coefficient calculation circuit 140. Detector 135 may be any detector known in the art that is capable of receiving a raw input and performing a detection algorithm on the raw input in an attempt to generate an output 150 that reflects an originally transferred or stored data set. Adaptive noise prediction coefficient calculation circuit 140 may be any circuit known in the art that is capable of adaptively determining appropriate noise prediction coefficients based on output 150, equalizer output 125 and the outputs from the respective noise prediction filters (i.e., NP0, NP1, . . . , NPn).

An initial primary target 155 is selected as primary target 122 by switching an initial selection control 160 to a multiplexer 170. Initial primary target 155 and noise prediction coefficients 145 are provided to a primary target calculation circuit 175. Initial primary target 155 may be a set of static filter taps that would be expected to provide reasonable performance by equalization filter 120. Noise prediction coefficients 145 are adaptively established as is known in the art some number of clock cycles after initial primary target 155 is applied to equalization circuit 120 via multiplexer 170. Primary target calculation circuit 175 calculates optimum primary target in floating-point format. The resulting target is provided to a scaling circuit 185 that scales the target values to match the scale of analog to digital converter 110. The resulting scaled floating-point optimum target is then used by an optimum fixed-point selection circuit 190 to determine fixed-point targets that are close to the optimum floating-point target in the least-square sense. A ranking circuit 195 selects a particular one of the fixed-point target values to provide as an updated primary target 197. Once updated primary target 197 is calculated, initial selection control 160 is switched such that updated primary target 197 is provided as primary target 122 via multiplexer 170.

In operation, initial selection control 160 is initially asserted to select initial primary target 155. Initial primary target 155 is provided to equalization filter 120 as primary target 122. Over a number of clock cycles, noise prediction coefficients 145 provided to noise prediction filter block 130 are adaptively calculated by adaptive noise prediction coefficient calculation circuit 140 using output 150, equalizer output 125 and the outputs from the respective noise prediction filters (i.e., NP0, NP1, . . . , NPn) using adaptive approaches known in the art. The noise prediction coefficients that are obtained are referred to as $h_k$, and are defined by the following vector:

$$h_k=[h_{k,0}, h_{k,1}, \ldots, h_{k,Nh}]^T \text{ for } k=0, 1, 2, \ldots, n.$$

Noise prediction coefficients 145 and initial primary target 155 are provided to primary target calculation circuit 175 where an overall target is determined for each of the $N_p$ filters in accordance with the following equation:

$$g_{m,k} = \sum_{l=0}^{min(k,Nq)} q_l h_{m,k-l}, \text{ for } k = 0, 1, \ldots, N_g, \text{ and } m = 0, 1, \ldots, n. \quad \text{Equation 3}$$

In this case, m denotes a particular filter. Using a frequency grid resolution of Δ=0.5/L where L is a large positive integer, the $(k,l)^{th}$ elements of the $(N_p+1)\times(N_p+1)$ matrix, $\tilde{E}_p$, and the $(N_p+1)\times(N_g+1)$ matrix, $\tilde{E}_{pg}$ are computed as:

$$1+(-1)^{l-k} \text{ for } k\neq l; \text{ and}$$

$$2L+2 \text{ for } k=l.$$

Of interest, due to the symmetry present in the matrices, $\tilde{E}_p$ and $\tilde{E}_{pg}$, only the longest row or column of the matrices need be computed.

The optimum floating-point primary target is then calculated in accordance with the following equation:

$$p_{opt}=\tilde{E}_p^{-1}\tilde{E}_{pg}g,$$

where $g=[g_0, g_1, \ldots, g_{Ng}]^T$ is obtained using equation 3 above. The calculated target is then scaled by scaling circuit 185 in accordance with the following equation:

$$p_{opt,k} \leftarrow p_{opt,k} * \mathrm{Round}\left(\frac{S_{adc}}{\sum_{l=0}^{Np} |p_{opt,l}|}\right),$$

where $S_{adc}$ is the maximum signal amplitude expected at the output of the equalizer and $p_{popt,k}$ is the $k^{th}$ tap of the target vector $p_{opt}$, for k=0, 1, ..., $N_p$. Next, the optimum fixed-point primary target is determined by optimum fixed-point selection circuit 190 to minimize the following cost function:

$$\tilde{J}(\tilde{p}) = \sum_{k=0}^{Np}\left(\frac{p_{opt,k}}{\sum_{l=0}^{Np} p_{opt,l}} - \frac{\tilde{p}_k}{\sum_{l=0}^{Np} \tilde{p}_l}\right)^2,$$

where $\tilde{p}=[\tilde{p}_0, \tilde{p}_1, \ldots, \tilde{p}_{Np}]^T$ corresponds to a point on the grid placed around the optimum floating-point target $p_{opt}$ obtained from scaling circuit 185. The grid for each coefficient is given by:

$$\{\tilde{p}_{opt,k}-M, \tilde{p}_{opt,k}-M+1, \ldots, \tilde{p}_{opt,k}+M-1, \tilde{p}_{opt,k}+M\}$$

for k=0, 1, ..., $N_p$ where $\tilde{p}_{opt,k}$=Round($\tilde{p}_{opt,k}$) and the integer M denotes the grid-size. The calculated optimum targets are then ordered in the order of increasing values of the cost function $\tilde{J}(\tilde{p})$ by ranking circuit 195. By so ordering, several ranked choices for the primary target are available around $p_{opt}$. One of the ranked choices is selected and provided as updated primary target 197.

Once updated primary target 197 is available, initial selection control 160 is switched causing multiplexer 170 to provide updated primary target 197 as primary target 122 to equalization filter 120. Some number of clock cycles after updated primary target 197 is applied to equalization filter 120, noise prediction coefficients 145 are adaptively updated as is known in the art.

Figure 2:
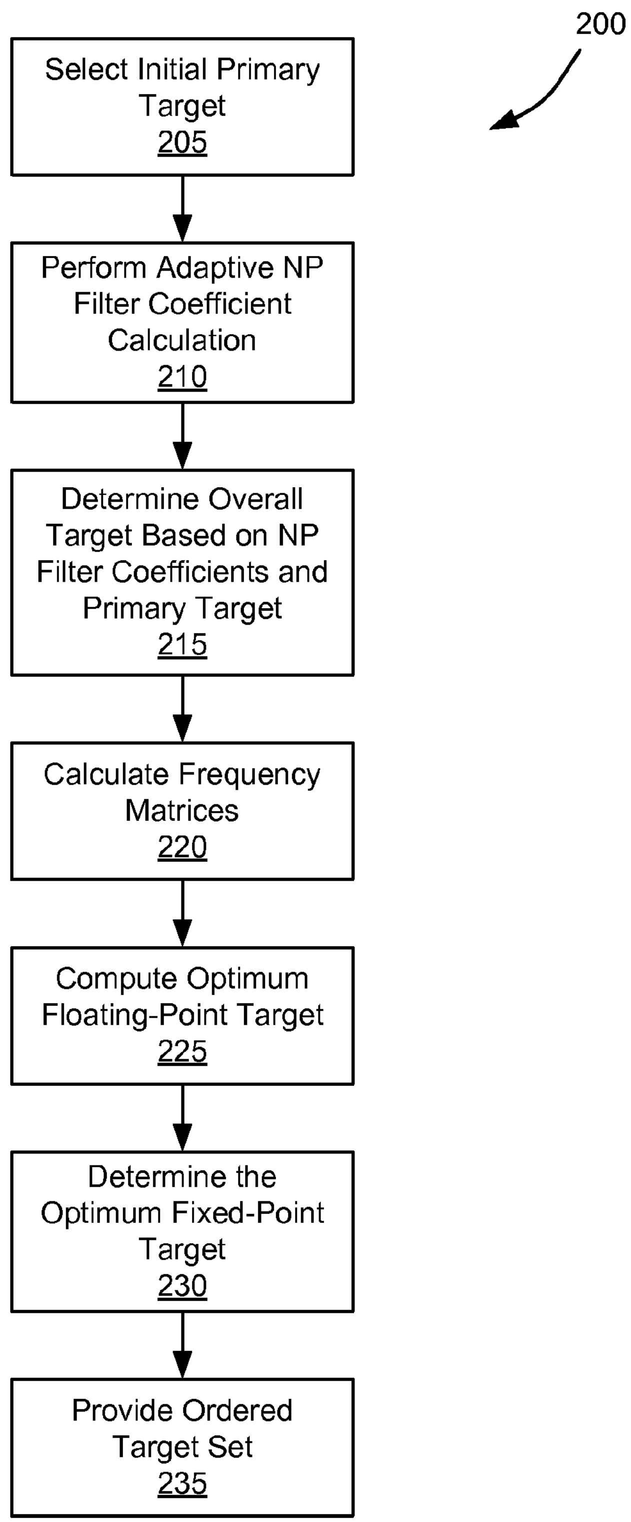
FIG. 2 is a flow diagram showing a method in accordance with some embodiments of the present invention for equalization target determination.

Turning to FIG. 2, a flow diagram 200 shows a method in accordance with some embodiments of the present invention for equalization target determination. Following flow diagram 200, an initial primary target is selected to be provided as the primary target to an equalizer (block 205). The initial primary target may be a set of static filter taps that would be expected to provide reasonable performance by an equalization filter to which they are provided. Over a number of clock cycles, noise prediction coefficients are adaptively calculated to adjust to the output of the equalizer (block 210). This approach to adaptive calculation of noise prediction coefficients is known in the art. The noise prediction coefficients that are obtained are referred to as $h_k$, and are defined by the following vector:

$$h_k-[h_{k,0}, h_{k,1}, \ldots, h_{k,Nh}]^T \text{ for } k=0, 1, 2, \ldots, n.$$

The overall target is then calculated based on the noise prediction coefficients and the initial primary target (block 215). The overall target is determined for each of the noise prediction filters (i.e., $N_p$ filters) in accordance with the following equation:

$$g_{m,k} = \sum_{l=0}^{min(k,Nq)} q_l h_{m,k-l}, \text{ for } k = 0, 1, \ldots, N_g, \text{ and } m = 0, 1, \ldots, n.$$

In this case, m denotes a particular noise prediction filter. Using this information, frequency matrices are calculated (block 220). For example, using a frequency grid resolution of Δ=0.5/L where L is a large positive integer, the $(k,l)^{th}$ elements of the $(N_p+1)\times(N_p+1)$ matrix, $\tilde{E}_p$, and the $(N_p+1)\times(N_g+1)$ matrix, $\tilde{E}_{pg}$ are computed as:

$$1+(-1)^{l-k} \text{ for } k\neq l; \text{ and}$$

$$2L+2 \text{ for } k=l.$$

Of interest, due to the symmetry present in the matrices, $\tilde{E}_p$ and $\tilde{E}_{pg}$, only the longest row or column of the matrices need be computed.

The optimum floating-point primary target is then calculated (block 225). This calculation may be done in accordance with the following equation:

$$p_{opt}=\tilde{E}_p^{-1}\tilde{E}_{pg}g,$$

where $g=[g_0, g_1, \ldots, g_{Ng}]^T$ is obtained using equation 3 above. In some cases, the calculated targets are then scaled to match an input analog to digital converter. This scaling may be performed in accordance with the following equation:

$$p_{opt,k} \leftarrow p_{opt,k} * \mathrm{Round}\left(\frac{S_{adc}}{\sum_{l=0}^{Np} |p_{opt,l}|}\right),$$

where $S_{adc}$ is the maximum signal amplitude expected at the output of the equalizer and $p_{opt,k}$ is the $k^{th}$ tap of the target vector $p_{opt}$, for k=0, 1, ..., $N_p$. Next, the optimum fixed-point primary target is calculated (block 230). This may be done by minimizing the following cost function:

$$\tilde{J}(\tilde{p}) = \sum_{k=0}^{Np}\left(\frac{p_{opt,k}}{\sum_{l=0}^{Np} p_{opt,l}} - \frac{\tilde{p}_k}{\sum_{l=0}^{Np} \tilde{p}_l}\right)^2,$$

where $\tilde{p}=[\tilde{p}_0, \tilde{p}_1, \ldots, \tilde{p}_{Np}]^T$ corresponds to a point on the grid placed around the optimum floating-point target $p_{opt}$ obtained from scaling circuit 185. The grid for each coefficient is given by:

$$\{\tilde{p}_{opt,k}-M, \tilde{p}_{opt,k}-M+1, \ldots, \tilde{p}_{opt,k}+M-1, \tilde{p}_{opt,k}+M\}$$

for k =0, 1, ..., $N_p$ where $\tilde{p}_{opt,k}$=Round($\tilde{p}_{opt,k}$) and the integer M denotes the grid-size. The calculated optimum targets are then ordered in the order of increasing values of the cost function $\tilde{J}(\tilde{p})$ (block 235). By so ordering, several ranked choices for the primary target are available around $p_{opt}$. A selected one of the ranked choices may then be provided as the primary target to the equalizer and the noise prediction coefficients can be adaptively calculated to conform to the updated primary target.

Figure 3:
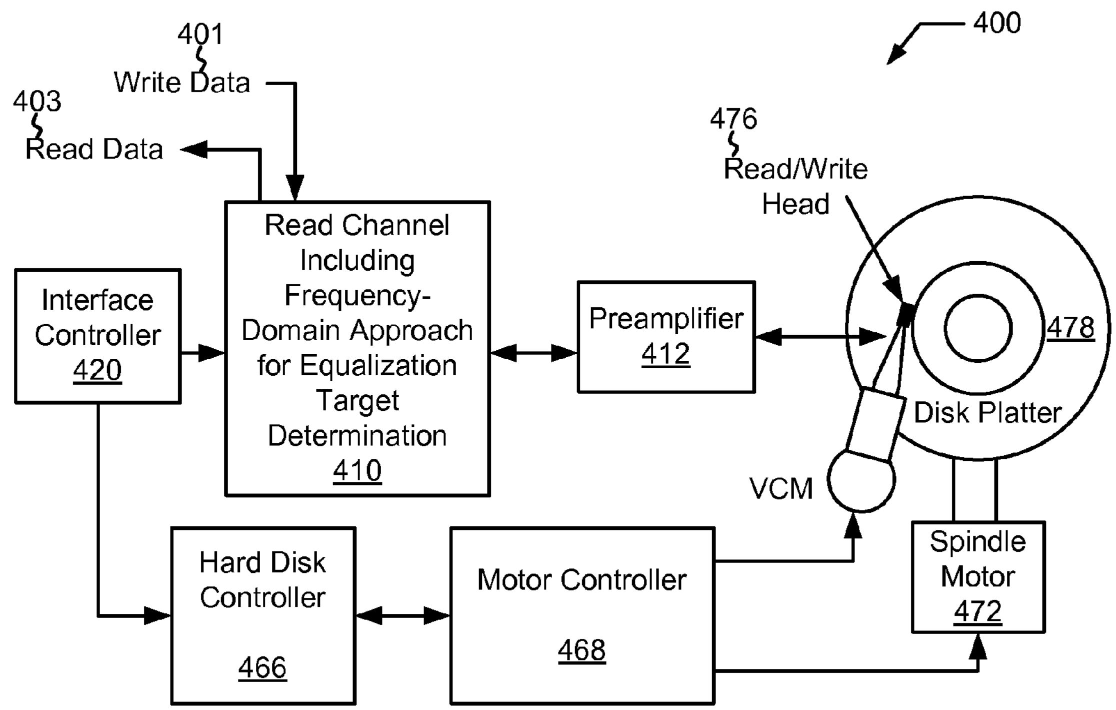
FIG. 3 shows a storage system including a read channel utilizing equalization target determination in accordance with various embodiments of the present invention.

Turning to FIG. 3, a storage system 400 including a read channel including frequency-domain approach for equalization target determination 410 is shown in accordance with various embodiments of the present invention. Storage system 400 may be, for example, a hard disk drive. The incorporated frequency domain approach for equalization target determination is capable of calculating an optimized primary target based on the frequency domain approach discussed above in relation to FIG. 2. In some embodiments, read channel module 410 may be implemented to include the circuitry discussed above in relation to FIG. 1. In addition, storage system 400 includes an interface controller 420, a preamplifier 412, a hard disk controller 466, a motor controller 468, a spindle motor 472, a disk platter 478, and a read/write head 476. Interface controller 420 controls addressing and timing of data to/from disk platter 478. The data on disk platter 478 consists of groups of magnetic signals that may be detected by read/write head assembly 476 when the assembly is properly positioned over disk platter 478. In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs).

Once read/write head assembly 476 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel module 410 via preamplifier 412. Preamplifier 412 is operable to amplify the minute analog signals accessed from disk platter 478. In addition, preamplifier 412 is operable to condition the data from read channel module 410 that is destined to be written to disk platter 478. In turn, read channel module 410 decodes and digitizes the received analog signal to recreate the information originally written to disk platter 478. This data is provided as read data 403 to a receiving circuit. Prior to normal operation, read channel module 410 performs a frequency-based computation to determine equalization targets. A write operation is substantially the opposite of the preceding read operation with write data 401 being provided to read channel module 410. This data is then encoded and written to disk platter 478.

Figure 4:
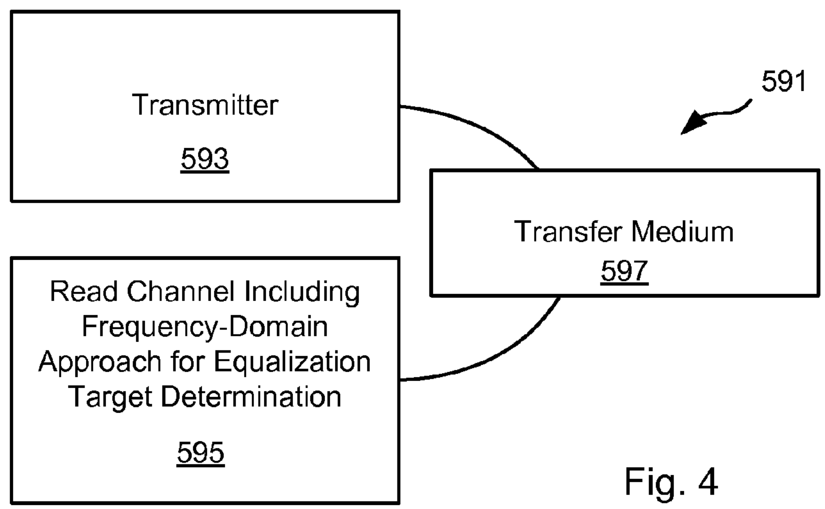
FIG. 4 shows a communication system including a receiver utilizing equalization target determination in accordance with different embodiments of the present invention.

Turning to FIG. 4, a communication system 591 comprising a receiver 595 including frequency-domain approach for equalization target determination is depicted in accordance with different embodiments of the present invention. Communication system 591 includes a transmitter 593 that is operable to transmit encoded information via a transfer medium 597 as is known in the art. The encoded data is received from transfer medium 597 by receiver 595. Receiver 595 incorporates an equalization target calculation circuit similar to that described above in relation to FIGS. 1-2. Receiver 595 decodes and digitizes the received analog signal to recreate the information originally transmitted by transmitter 593. Prior to normal operation, receiver module 595 performs a frequency-domain based computation to determine equalization targets. Based on the disclosure provided herein, one of ordinary skill in the art will recognize a variety of mediums over which data transfer may be done, requiring a receiver with equalizer and target to recover the original data stream.

In conclusion, the invention provides novel systems, devices, methods and arrangements for determining equalization targets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for performing equalization in a storage device, the method comprising:

providing an equalizer circuit, wherein operation of the equalizer circuit is governed by a target value;

providing a filter circuit, wherein the filter circuit is governed by a filter coefficient;

providing an initial value to the equalizer circuit as the target value;

calculating an overall target based at least in part on the initial value and the filter coefficient;

calculating an updated value based on the overall target; and providing the updated value to the equalizer circuit as the target value.

2. The method of claim 1, wherein calculating the updated value based on the overall target includes:

calculating frequency matrices based on the overall target.

3. The method of claim 2, wherein calculating the updated value based on the overall target further includes:

computing a floating-point target based on the frequency matrices.

4. The method of claim 3, wherein calculating the updated value based on the overall target further includes:

determining a fixed-point target based on the floating-point target.

5. The method of claim 4, wherein determining the fixed-point target based on the floating point target includes minimizing the following cost function:

$$\tilde{J}(\tilde{p}) = \sum_{k=0}^{Np} \left( \frac{p_{opt,k}}{\sum_{l=0}^{Np} p_{opt,l}} - \frac{\tilde{p}_k}{\sum_{l=0}^{Np} \tilde{p}_l} \right)^2.$$

wherein $\tilde{J}(\tilde{p})$ is the cost function, wherein Np corresponds to the number of taps of the primary target, wherein $p_{opt,k}$ is the $k^{th}$ tap of the primary target, wherein $p_{opt,l}$ is the $l^{th}$ tap of the primary target, wherein $\tilde{p}_k$ corresponds to a $k^{th}$ point defined by the primary target, and wherein $\tilde{p}_l$ corresponds to a $l^{th}$ point defined by the primary target.

6. The method of claim 3, wherein calculating the updated value based on the overall target further includes:

scaling the floating-point target.

7. The method of claim 6, wherein the method further comprises:

providing an analog to digital converter, wherein the analog to digital converter provides a series of digital samples to the equalizer; and wherein scaling the floating point target is operable to conform the floating-point target to a range of the analog to digital converter.

8. The method of claim 1, wherein the filter circuit is a noise predictive filter circuit.

9. The method of claim 1, wherein the filter coefficient is a noise predictive filter coefficient.

10. An equalization circuit, the circuit comprising:

an equalization filter, wherein operation of the equalization filter is governed by a target value;

a noise prediction filter circuit, wherein the noise prediction filter circuit is governed by a noise prediction coefficient;

an overall target calculation circuit, wherein the overall target calculation circuit calculates an overall target based at least in part on a first value of the target value and the noise prediction coefficient;

a primary target calculation circuit, wherein the primary target calculation circuit calculates a primary target based at least in part on a first value of the overall target and a frequency matrix; and a fixed-point selection circuit, wherein the fixed-point selection circuit determines a fixed-point target based on the floating-point target.

11. The equalization circuit of claim 10, wherein determining the fixed-point target based on the floating-point target is done by minimizing the following cost function:

$$\tilde{J}(\tilde{p}) = \sum_{k=0}^{Np} \left( \frac{p_{opt,k}}{\sum_{l=0}^{Np} p_{opt,l}} - \frac{\tilde{p}_k}{\sum_{l=0}^{Np} \tilde{p}_l} \right)^2.$$

wherein $\tilde{J}(\tilde{p})$ is the cost function, wherein Np corresponds to the number of taps of the primary target, wherein $p_{opt,k}$ is the $k^{th}$ tap of the primary target, wherein $p_{opt,l}$ is the $l^{th}$ tap of the primary target, wherein $\tilde{p}_k$ corresponds to a $k^{th}$ point defined by the primary target, and wherein $\tilde{p}_l$ corresponds to a $l^{th}$ point defined by the primary target.

12. The equalization circuit of claim 10, wherein the primary target calculation circuit receives an input from an analog to digital converter, and wherein the equalization circuit further comprises:

a scaling circuit, wherein the scaling circuit is operable to scale the floating-point target to a range consistent with the analog to digital converter.

13. The equalization circuit of claim 12, wherein scaling the floating-point target to a range consistent with the analog to digital converter is done in accordance with the following equation:

$$p_{opt,k} \leftarrow p_{opt,k} * \text{Round}\left( \frac{S_{adc}}{\sum_{l=0}^{Np} |p_{opt,l}|} \right).$$

wherein $S_{adc}$ is a maximum signal amplitude expected at an output of the equalizer filter, wherein $p_{opt,k}$ is the $k^{th}$ tap of the primary target, wherein $p_{opt,l}$ is the $l^{th}$ tap of the primary target, and where Np corresponds to the number of taps of the primary target.

14. The equalization circuit of claim 10, wherein the equalization filter is implemented as a digital finite impulse response filter.

15. The equalization circuit of claim 10, wherein the primary target calculation circuit further calculates matrices based on the overall target, wherein the matrices are used to calculate the primary target.

16. The equalization circuit of claim 15, wherein the primary target calculation circuit further calculates a floating-point target based on the frequency matrices.

17. A storage device, the storage device comprising:

a storage medium;

a read/write head assembly disposed in relation to the storage medium; and a read channel circuit including an equalization circuit, wherein the equalization circuit includes:

an equalization filter, wherein operation of the equalization filter is governed by a target value;

a noise prediction filter circuit, wherein the noise prediction filter circuit is governed by a noise prediction coefficient;

an overall target calculation circuit, wherein the overall target calculation circuit calculates an overall target based at least in part on a first value of the target value and the noise prediction coefficient;

a primary target calculation circuit, wherein the primary target calculation circuit calculates a primary target based at least in part on a first value of the overall target and a frequency matrix; and a fixed-point selection circuit, wherein the fixed-point selection circuit determines a fixed-point target based on the floating-point target.

18. The storage device of claim 17, wherein the primary target calculation circuit further calculates matrices based on the overall target, wherein the matrices are used to calculate the primary target.

19. The storage device of claim 18, wherein the primary target calculation circuit further calculates a floating-point target based on the frequency matrices.

20. The storage device of claim 17, wherein determining the fixed-point target based on the floating-point target is done by minimizing the following cost function:

$$\tilde{J}(\tilde{p}) = \sum_{k=0}^{Np} \left( \frac{p_{opt,k}}{\sum_{l=0}^{Np} p_{opt,l}} - \frac{\tilde{p}_k}{\sum_{l=0}^{Np} \tilde{p}_l} \right)^2.$$

wherein $\tilde{J}(\tilde{p})$ is the cost function, wherein Np corresponds to the number of taps of the primary target, wherein $p_{opt,k}$ is the $k^{th}$ tap of the primary target, wherein $p_{opt,l}$ is the $l^{th}$ tap of the primary target, wherein $\tilde{p}_k$ corresponds to a $k^{th}$ point defined by the primary target, and wherein $\tilde{p}_l$ corresponds to a $l^{th}$ point defined by the primary target.

* * * * *